Dec. 29, 1959  K. C. ROCK, JR  2,919,404
BRIDGE DEMODULATOR PHASE DETECTING CIRCUIT
Filed June 15, 1954

INVENTOR.
Kingsley C. Rock, Jr.
BY
*P. H. Lamphere*
ATTORNEY

United States Patent Office 2,919,404
Patented Dec. 29, 1959

2,919,404

BRIDGE DEMODULATOR PHASE DETECTING CIRCUIT

Kingsley C. Rock, Jr., Englewood, Colo., assignor, by mesne assignments, to Minneapolis-Honeywell Regulator Company, Minneapolis, Minn., a corporation of Delaware Application June 15, 1954, Serial No. 436,938

2 Claims. (Cl. 324—83)

This invention relates to a demodulator or detector circuit particularly adapted for use to discriminate between alternating current signals which are 180 degrees apart in phase, and whose amplitude it is desired to determine.

There are many mechanical systems where it is desired to measure the magnitude of vibrations, strains, or displacements of the mechanical parts and by employing a suitable pick-up means sensitive to such vibrations and functioning to convert the vibrations to an electrical signal voltage, said pick-up being combined with the circuit of this invention, the measurement of the phase and amplitude of the signal voltage may be accomplished. Systems having a movable armature or core are typical of the type wherein the present detector would be used for measuring static or dynamic displacement thereof. The displacement of the core or the like may provide a voltage having a current in phase or 180 degrees out of phase with respect to a carrier source of known frequency, and the detector of the type hereinafter described will distinguish between and indicate the phase and amplitude of the displacement generated. Following detection, a proportional direct current is applied to a suitable current indicating instrument, such as a galvanometer in a recording oscillograph calibrated for phase and amplitude readings, and thereby a record or indication of the amplitude and phase of the voltage representing the picked-up strain or vibration may be obtained.

Basically, the phase sensitive circuit reduces values of alternating current, representing the core displacement, to proportional direct currents for measurement on a sensitive direct current type of instrument and wherein the polarity of the direct current reverses when the phase of the alternating current reverses. The circuit is also supplied with a reference current from a source of known frequency, and the phase of the reference or excitation current is employed as the phase reference with which the phase of the measurement or alternating current is compared. Means is provided in the present circuit for compensating for any changes in the amplitude and frequency of the carrier or reference source, and linear response is achieved particularly when the signal source is in 0 or 180 degree phase relationship with the reference frequency.

The demodulator or detector of this invention employs a circuit in the nature of a bridge having rectifier means, such as a half wave rectifier element, in each of a pair of arms or loops and a reference carrier signal of known frequency applied to each such loop. By properly balancing the system, the voltages from the reference source will be equal in each loop, and current will flow through one rectifier during one half of the cycle and through the other rectifier during the other half of the cycle, and the connected calibrated galvanometer will indicate a resulting current of zero, as there will be no tendency for current to flow through the instrument. If the measurement or signal current is also applied but in one loop only, and assuming it is in phase with the carrier frequency, then more current will flow through that loop than the other and the galvanometer will indicate, for example, a movement of the pointer to the left, such indicating the phase of the signal and the amount of movement will be directly proportional to the amplitude of the signal representing the mechanical displacement or vibration. A zero reading will also appear at the galvanometer if an in phase signal current is applied to both loops. On the other hand, if a 180 degree out of phase signal current is applied to one loop only, of the pair, the current flowing in said loop will decrease with respect to the current in the other loop, and the pointer will move to the right, indicating the 180 degree phase difference and the amount of movement will be directly proportional to the amplitude of the signal voltage.

Actually, my circuit is preferably used with alternating signal voltages and reference voltages applied to both loops thereof, the signal in one loop being in phase with the reference signal which results in a current increase in that loop and the signal in the other loop being 180 degrees out of phase with respect to the reference signal which results in a current decrease in the other loop. This condition will produce a resultant current flow through the instrument from, for example, top to bottom, and reversing the phase of the signal voltages applied to both loops will produce a resultant current through the instrument from bottom to top.

Therefore, it is an object of this invention to provide a demodulator or detector which is simple in construction and effective in respect to phase sensitivity and amplitude measurement.

Another object of the detector of the type described wherein signal and reference voltages are applied to both loops thereof is to provide means for automatically compensating for any changes in the amplitude and frequency of the reference source.

Other objects of the invention will be apparent from the following description taken in connection with the accompanying drawings in which.

Figure 1:
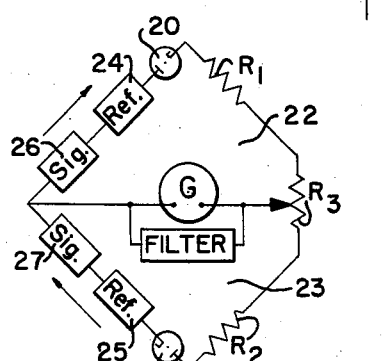
Figure 1 is a schematic diagram of a detector in accordance with this invention.

In Figure 1, there is shown a circuit having, in a pair of loops 22 and 23, half wave rectifying elements 20 and 21 of any suitable type, such as a crystal rectifier, dry plate rectifier, or diode tube rectifier, and each rectifier element 20 and 21 conducts in a unilateral direction as indicated by the arrows of Figure 1. In each leg or loop 22 and 23 a reference voltage, such as from a source of oscillation 24 and 25 of known frequency is applied; for example, a frequency within the range of 60 cycles to 10 kc. There may be applied in one or both arms 22 and 23 a signal or measurement source of voltage 26 and 27 whose amplitude and phase are to be determined. The source of frequency at 25 and 24 is assumed to be a carrier frequency and the amplitude and phase of each signal source 26 and 27 is desired to be detected in the demodulator. Resistors $R_1$ and $R_2$ are preferably of equal value, and although not always necessary, are desirable to reduce the current flow and to provide sufficient impedance to permit balancing of the bridge circuit. A potentiometer $R_3$ is connected at the junction of the loops, and a current indicating instrument, such as a galvanometer G, is connected in shunt or in parallel with loops 22 and 23. Shunted around the galvanometer may be a filter unit for the purpose of removing any alternating current ripple, and this is necessary particularly if the galvanometer has appreciable response at the carrier or reference frequency.

The non-linearity of rectifiers 20 and 21 at low signal levels is overcome by having them continuously energized by the reference or carrier voltage, and the maximum linear output which can be obtained is directly proportional to the amount of reference voltage applied. It is to be understood that the rectifier tubes may be of the full wave type with separate cathodes, half of the tube being inserted in each loop 22 and 23 or that full wave rectifiers for each loop may be employed, and the latter is preferred, as will be explained in connection with Figures 2 and 3. Further, suitable transformers are used in applying the reference and signal voltages, and since the galvanometer load is of low impedance, the bridge impedance must be low and the transformer impedance should match impedance at the insertion points in each leg, all of this being necessary to obtain optimum power transfer. Separate transformers may be used at each insertion point or a single transformer for reference voltages may be used; but in the latter case, it is extremely important in low impedance circuits that the multiple secondaries be wound bifilar to provide exactly equal resistances in the two adjacent arms of the bridge. If these limitations are closely adhered to, the bridge-like demodulator or detector will exhibit the very desirable feature of having a sensitivity slope which will be independent of the amplitude of the reference voltage and will automatically compensate for any changes in the amplitude or frequency of the reference signal. Accordingly, the detector will have no zero shift, due to amplitude changes of the reference voltage, once the demodulator is balanced, this being accomplished by $R_3$ which compensates or balances for small impedance differences in the circuit components.

The operation of the circuit shown schematically in Figure 1 may be analyzed by first assuming that no signal or measurement voltage is applied at 26 and 27 and that the impedance at the insertion points of the signal voltages in each arm is zero. Reference frequencies are applied at 24 and 25, and the rectified current from reference voltage 24 of, for example 8 k.c., flows through the galvanometer from right to left and a similar rectified current passes through the galvanometer during the opposite half of the frequency cycle from left to right. If $R_3$ is properly adjusted, the rectified currents will be exactly equal and opposite, and the resutlant current flow through the galvanometer will be zero, due to the balanced system. Once there is a balancing, the current reading will be automatically maintained at zero regardless of the frequency and amplitude of the reference signal.

Now, if an alternating signal is applied at 26 in phase with voltage 24, the voltage and current in loop 22 will increase and, if at the same time, an alternating signal 180 degrees out of phase with the reference signal is applied at 27, the voltage and current in loop 23 will decrease. This will produce a resultant current flow through the calibrated galvanometer G from right to left, and the amount of movement of the galvanometer needle will indicate the amplitude of the signal. Reversing of the phase of the signal voltage in both loops 22 and 23 will produce a resultant current through the galvanometer from left to right and a corresponding movement of the galvonometer needle. Accordingly, the amount and direction of the current flowing through the instrument G will be directly proportional to the signal or excitation voltage applied, as long as the signal voltage is in phase or 180 degrees out of phase with respect to the reference voltage. Regarding application of the measurement voltage to only one loop 22 or 23 at a time, reference is hereby made to foregoing statements to this effect.

Figure 2:
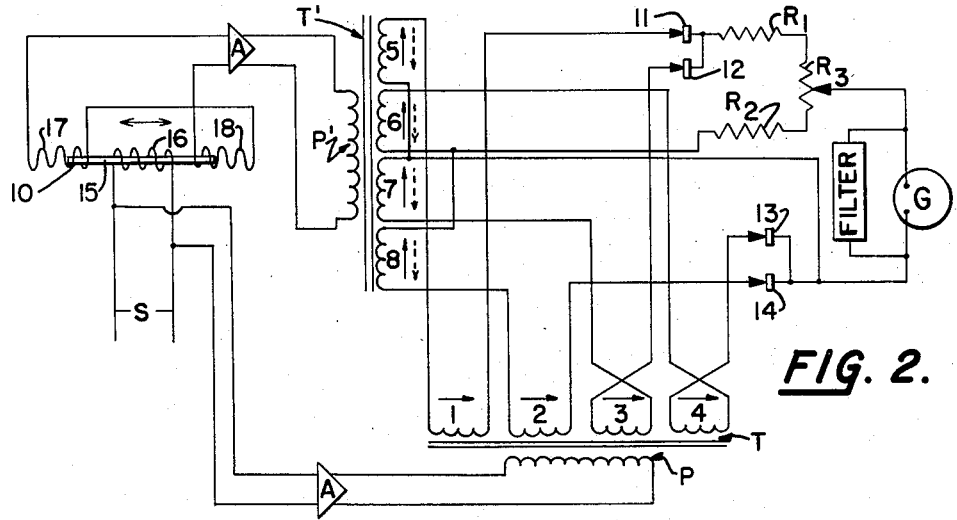
Figure 2 is a schematic diagram of a system employing the teachings of the detector of this invention.
Figure 3:
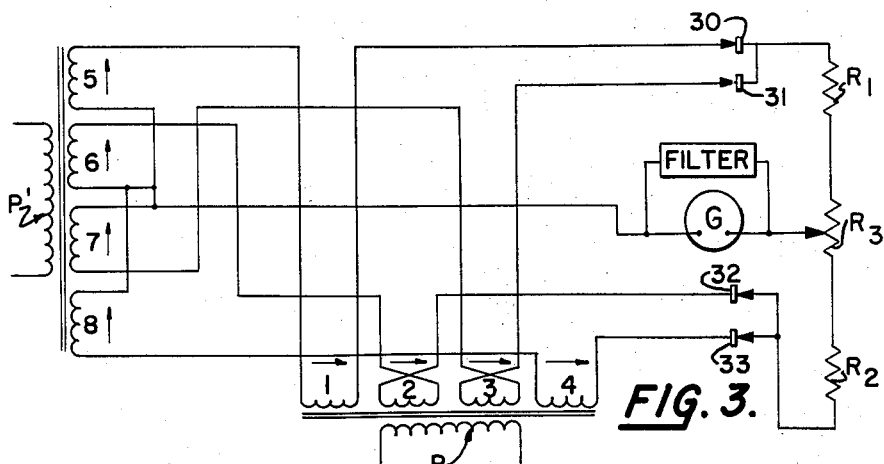
Figure 3 is a schematic diagram of a system slightly modified from the showing in Figure 2.

Applications of the detector of this invention are shown in Figures 2 and 3, and both circuits utilize full wave rectifiers in each loop, these rectifiers preferably being of the dry type.

Considering the system of Figure 2 first, S represents the reference or excitation frequency and P and P' are primaries of transformers generally represented at T and T', transformer T having secondaries 1, 2, 3, and 4 and transformer T' havinng secondaries 5, 6, 7, and 8. The elements represented by $R_1$, $R_2$, $R_3$, G and the filter are along the same lines as described in connection with Figure 1. Full wave rectifiers are employed having elements 11 and 12 in one loop and elements 13 and 14 in the other loop, the direction of current through the rectifiers being as shown by the symbol arrows. A differential transformer is shown at 10 having a core 15, representing the mechanical part whose movement is to be determined by the electrical signal generated thereby, which provides inductive coupling from winding 16, connected directly with S, to coils 17 and 18, the latter coils being connected in series, but in revesre polarity, with primary P'. Any desired amount of amplification of the input currents to primaries P and P' may be provided by the conventional means illustrated employing, for example, individual triodes.

In operation, the reference voltage applied to winding 16 will result, providing core 15 is centered, in secondary voltages being induced in coils 17 and 18, but since these last named coils are connected in reverse, no voltage output will appear at P'. Current resulting from the reference voltage will, during the first half cycle, flow, due to the polarities of windings 1, 2, 3, and 4, in the direction indicated by the solid arrows and in the opposite direction during the other half cycle. By properly tracing the detector circuit, it being noted that coils 3 and 4 are connected in reverse, it can be seen that full wave rectification of the reference voltage will occur at 11, 12 resulting in current in one loop traveling through the current indicating instrument G from top to bottom, and similar rectification will occur at 13, 14 resulting in current in the other loop traveling through G from bottom to top. Assuming the circuit has been properly balanced, in a manner described in connection with Figures 1 and 2, the resultant current reading at G will be zero, and this will be true regardless of the variance in the frequency and amplitude of the reference frequency S.

Now, assuming that a measurement output current in phase with the reference frequency flows in P' when the core 15 moves to the left and, of course, there would be current in P' due to greater inductive coupling in coil 17 than coil 18, the following will result. During the first half cycles, current will flow in secondaries 1 to 8 inclusive in the direction indicated in solid lines, due to coil polarities (and in the opposite direction during the next half cycles), such resulting in an increase in current through the loop containing elements 11 and 12 and a decrease in current in the loop containing elements 13 and 14. A similar increase and decrease in current will result in the same loops during the other half of the cycles, the net result being a resultant current flowing from top to bottom in the galvanometer. Accordingly, the needle of the galvanometer will move to the left indicating a phase of 0 degrees of the measurement signal with respect to the standard or reference frequency, and the amount of such movement of the needle will reveal the amplitude of the measurement alternating signal, inasmuch as the indicating instrument is calibrated to this effect.

The resultant current in P', when the core 15 moves to the right, will be opposite in phase to that first assumed and, therefore, 180 degrees out of phase with respect to the reference or excitation frequency. During the first half cycle, the current in windings 5, 6, 7, and 8 will flow in the direction indicated by the arrows in dotted lines, while the current in coils 1, 2, 3, and 4 will flow as indicated in solid lines. The second half cycle of both the reference and measurement signals will result in current flow in coils 1, 2, 3 and 4 in opposite direction to the arrows and in coils 5, 6, 7 and 8 in the direction of the solid arrows. The net result of the complete cycle flows will be a resultant current in G from bottom to top, and the pointer or needle will indicate the 180 degree phase difference and the amplitude of the measurement signal.

The detector of Figure 3 is quite similar to that of Figure 2 but includes a change in direction of conduction of rectifier elements 32 and 33 but not of elements 30 and 31, and a reversal of connections of coils 2 and 3 instead of 3 and 4. The operation of this detector will also result, and this should appear clear in tracing the circuit, in similar movement of the galvanometer needle for 0 and 180 degree phases of the measurement signal with respect to the reference frequency.

Figure 4:
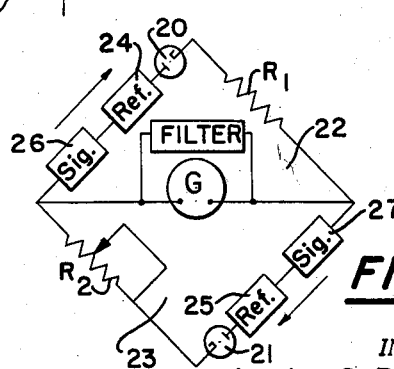
Figure 4 is a schematic diagram of a slightly modified form of detector in accordance with this invention.

The circuit shown schematically in Figure 4 is identical in operation and construction with that of Figure 1 with exception that potentiometer $R_3$ has been eliminated and instead, $R_1$ or $R_2$, the latter in this instance, has been changed to a variable resistance for balancing purposes.

Although the detector is particularly adapted for use with measurement signals at 0 or 180 degree phase with respect to the standard frequency, any odd phase angle between 0 and 180 degrees could be detected for phase and amplitude by suitably calibrating the galvanometer although the circuit would probably result in non-linear response.

The above description and drawings disclose several embodiments of the invention, and specific language has been employed in describing the several figures. I am aware that modifications and alterations can be made without departing from the fundamental principles of my invention as embodied in the disclosed circuits and, therefore, I desire it to be understood that the scope of the invention is not to be limited except in accordance with the appended claims.

What is claimed is:

1. A detector for measurement of the phase and amplitude of signal voltages comprising a pair of loops with the end terminals of each being electrically connected in series to provide a bridge arrangement, each loop containing in series arrangement and individual to that loop a separate rectifier, a separate means for applying therein an alternating reference voltage, and a separate means for applying therein an alternating signal that is to be measured for phase and amplitude, a direct current indicating instrument connected in parallel with each of said loops, and a potentiometer resistor for permitting balancing adjustments of the reference voltage currents, said resistor having a resistance portion connected with each loop in series with one set of said electrically connected end terminals, and having an adjustable contact connected to said instrument in said parallel connection thereof.

2. A detector-circuit for measurement of the phase and amplitude of signal voltages comprising a pair of loops with the end terminals of each being electrically connected in series to provide a bridge arrangement, one of said loops containing in series arrangement a rectifier, means for applying therein an alternating reference voltage, and means for applying therein an alternating signal that is to be measured for phase and amplitude, the other of said loops containing a rectifier and means individual to said other of said loops for applying therein an alternating reference voltage, a direct current indicating instrument connected in a separate circuit which is connected in parallel with each of said loops, and a variable resistance means for permitting balancing adjustments of the reference voltage currents connected in the circuit with each loop, said resistance means having a resistance portion connected in said series circuit connection of both of said loops and having an adjustable contact included in said connection of said separate circuit in parallel with each of said loops.

References Cited in the file of this patent

UNITED STATES PATENTS

| | | |
|---|---|---|
| 1,708,544 | Kummerer | Apr. 9, 1929 |
| 2,407,140 | Coake | Sept. 3, 1946 |
| 2,481,912 | Dorsman | Sept. 13, 1949 |
| 2,562,912 | Hawley | Aug. 7, 1951 |
| 2,696,582 | Willard | Dec. 7, 1954 |
| 2,727,999 | Rusler | Dec. 20, 1955 |
| 2,774,932 | Patton | Dec. 18, 1956 |

OTHER REFERENCES

"Phase Sensitive Detectors," article in Electronics, February 1954, pages 188–190.